Feb. 21, 1933.   J. C. McCUNE   1,898,555
TRACTION INCREASING DEVICE
Filed Feb. 5, 1929
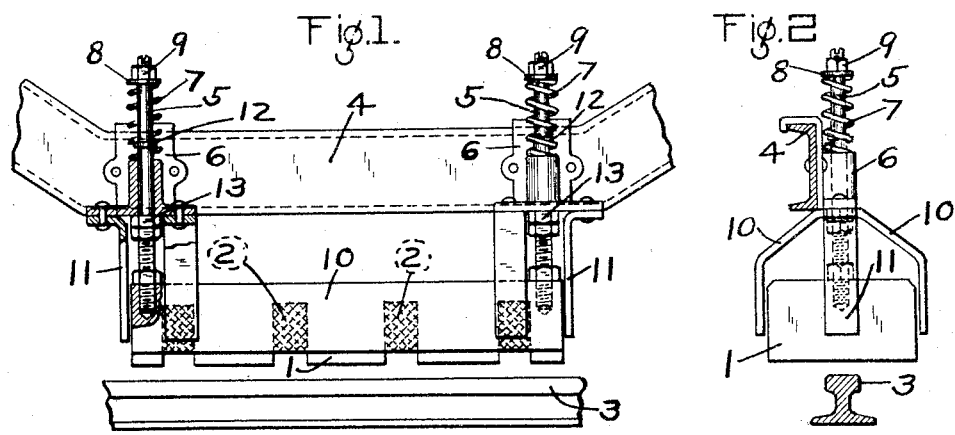
INVENTOR
JOSEPH C. McCUNE
BY Wm. M. Cady
ATTORNEY Patented Feb. 21, 1933

1,898,555

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRACTION INCREASING DEVICE

Application filed February 5, 1929. Serial No. 337,623.

This invention relates to magnetic means for increasing the traction of the wheels of a vehicle, so that a greater braking force can be applied to the wheels, without causing the wheels to skid.

The principal object of my invention is to provide an improved traction increasing means.

In the accompanying drawing; Figure 1 is a side elevation of the traction increasing magnet device as applied to a car truck; and Fig. 2 an end view of the construction shown in Fig. 1.

As shown in Fig. 1, a magnet 1 having coils 2 is suspended above each rail 3, the magnet being supported from the truck frame member 4 by rods 5, which extend through bores in brackets 6, mounted on the member 4.

The magnet is yieldingly maintained away from the rails by springs 7, which surround the rods 5 and are interposed between the brackets 6 and washers 8, which are held in place by nuts 9. The magnet 1 is mounted between guide members 10, secured to the brackets 6, and adapted to guide the magnet laterally, and endwise movement of the magnet is prevented by guide members 11, also secured to the brackets 6.

Downward movement of the magnet is limited by stop rings 12, secured to the rods 5, so that the magnet is prevented from moving into engagement with the rail.

The springs 7 are under initial tension and upward movement of the magnet is limited by nuts 13 on the rods 5, the nuts being adapted to engage the under face of the brackets 6. The normal spacing between the magnet and the rail may be adjusted to the desired degree by adjusting the nuts 13.

My invention may be employed in connection with a safety car control equipment such as is specifically described in application, Serial No. 503,476, a division of this application filed December 19, 1930.

In operation, when the circuit, not shown, including the magnet 1 is energized, the magnet is moved toward the rail 3 by magnetic pull, the magnet being prevented from engaging the rail by the engagement of the collars 12 with the upper ends of the brackets 6. The truck frame is drawn with considerable force toward the rail and the traction is thus materially increased.

A hand operated switch (not shown) may be provided, to permit the opening of the circuit to the traction increasing magnet coils 2, when it is not desired that the traction increasing feature should function.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a traction increasing apparatus for rail vehicles, the combination with an electromagnet, of a member carried by the vehicle, rods secured to said magnet, brackets secured to said member in which said rods are slidably mounted, springs for yieldingly maintaining said magnet supported above the rail, and means for maintaining said springs under initial compression.

2. In a traction increasing apparatus for rail vehicles, the combination with an electromagnet, of a member carried by the vehicle, rods secured to said magnet, brackets secured to said member in which said rods are slidably mounted, springs acting on said rods and urging said magnet away from the rail, means for limiting movement of said magnet away from the rail, and means for limiting movement of said magnet toward the rail.

3. In a traction increasing apparatus for rail vehicles, the combination with an electromagnet, of means for supporting said magnet on the vehicle to permit movement of the magnet toward and away from the rail, means for limiting the movement of said magnet toward and from the rail, and guide members, between which said magnet is slidably mounted, for preventing longitudinal movement of the magnet.

4. In a traction increasing apparatus for rail vehicles, the combination with an electromagnet, of means for supporting said magnet on the vehicle to permit movement of the magnet toward and away from the rail, means for limiting the movement of said magnet toward and from the rail, and guide members, between which said magnet is slidably mounted for preventing lateral movement of the magnet.

5. In a traction increasing apparatus for rail vehicles, the combination with an electromagnet, of means for slidably supporting said magnet to permit movement thereof toward and from the rail, means for limiting the movement of said magnet toward and from the rail, and means for retaining said magnet against lateral or longitudinal displacement.

6. In a traction increasing apparatus for rail vehicles, the combination with an electromagnet, of means carried by the vehicle for slidably supporting said magnet to permit movement thereof toward and from the rail, yieldable means for normally maintaining said magnet away from the rail, means for limiting the movement of the magnet from the rail, means for energizing said electromagnet to overcome the effect of said yieldable means to draw the magnet toward the rail, means for limiting the movement of said magnet toward the rail, and guide means for preventing lateral or longitudinal movement of said magnet.

In testimony whereof I have hereunto set my hand, this 1st day of February, 1929.

JOSEPH C. McCUNE.